: 2,708,017
Patented May 10, 1955

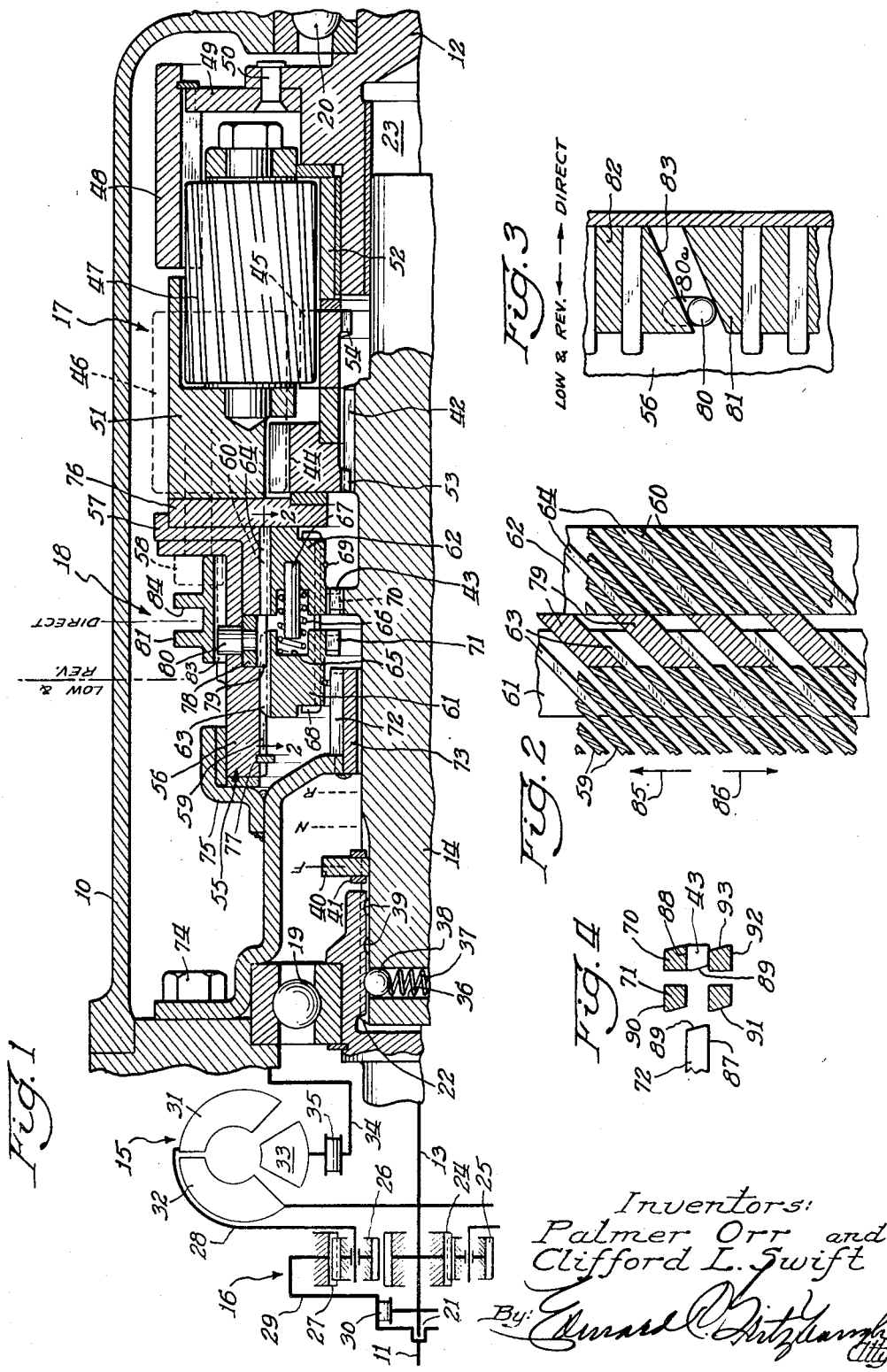

2,708,017

TURBINE TRANSMISSION

Palmer Orr and Clifford L. Swift, Muncie, Ind., assignors to Borg-Warner Corporation, Chicago, Ill., a corporation of Illinois Application February 9, 1951, Serial No. 210,199

2 Claims. (Cl. 192—18)

The present invention relates to transmissions and more particularly to transmissions for automotive vehicles.

The principal object of the present invention is to provide a transmission which may be used in conjunction with a hydraulic torque converter and which itself will provide two forward speed drives and a reverse drive between the hydraulic torque converter and the driven wheels of the vehicle.

Another object of the invention is to provide a transmission particularly suitable for application in an automotive vehicle and which employs a torque responsive mechanism that tends to shift the transmission from a low speed ratio drive to a high speed ratio drive whenever the vehicle itself tends to drive the driving engine and which tends to shift the transmission from the high speed ratio drive to the low speed ratio drive whenever the vehicle engine tends to drive the vehicle. In this connection the torque responsive mechanism has an associated blocking member which is externally controlled and which is movable oscillatably to either of two positions in order to block movement of the torque responsive mechanism and prevent the transmission from being shifted to a different speed ratio irrespective of the tendency on the part of the torque responsive mechanism to shift the transmission.

Another object of the invention is to provide a transmission having a shaft that is longitudinally shiftable to either a forward or a reverse drive position and also having a torque responsive mechanism that is shiftable to one position to complete a direct drive while the shaft is in its forward drive position and shiftable to a second position to respectively complete either a low forward drive or a reverse drive through the transmission depending upon whether the shaft is in its forward or reverse drive position.

The torque responsive mechanism utilized herein comprises a pair of shiftable elements spirally splined to the reaction element of the planetary gear set and when the reaction on the reaction element is in one direction, which occurs when the vehicle engine drives the vehicle, there is a tendency for the mechanism to shift to a position in which a set of teeth on one of the elements is brought into engagement with a set of brake teeth to establish a reduced drive through the transmission. When the reaction on the reaction element is in the opposite direction, which takes place when the vehicle tends to drive the engine, there is a tendency for the torque responsive mechanism to shift to a position in which a set of teeth on the other shiftable element is brought into engagement with a set of clutch teeth on the transmission drive shaft to establish a direct drive through the transmission. Due to the fact that the different sets of engageable teeth are beveled there can be no positive engagement thereof until synchronization between the sets of teeth is effected and accordingly each shift from low to high speed ratio and vice versa is effected very smoothly and without clash. The externally controlled blocking member is effective only to condition the torque responsive mechanism for making a shift or to prevent it from making a shift, the torque responsive mechanism itself at all times actually making the shift.

The above and other objects and numerous advantages of the present invention will become apparent from the following detailed description when read in conjunction with the accompanying drawings wherein:

Fig. 1 is a longitudinal sectional view of the transmission embodying the principles of the present invention;

Fig. 2 is a developed sectional view taken substantially along the line 2—2 of Fig. 1;

Fig. 3 is a developed sectional view of the blocking device shown in Fig. 1; and Fig. 4 is a sectional view of the engageable teeth in the engaging device shown in Fig. 2.

With reference now to the drawings wherein like reference numerals in the several views identify identical parts throughout, the transmission is enclosed in a housing 10 and includes a drive shaft 11, a driven shaft 12 and two intermediate shafts 13 and 14. The transmission also includes a conventional hydraulic torque converter 15, a front planetary gear set 16 which functions to drive the hydraulic torque converter 15 at an overdrive with respect to the drive shaft 11 during low vehicle speeds, a rear planetary gear set 17 and a combined clutching and braking device 18. The intermediate shaft 13 is rotatably mounted in the housing 10 by means of the ball bearing 19 and the driven shaft 12 is rotatably mounted by means of the ball bearing 20. The intermediate shaft 13 is piloted in the drive shaft 11 as indicated at 21 and the intermediate shaft 14 is splined to the intermediate shaft 13 as indicated at 22 and also is piloted in the driven shaft 12 as indicated at 23.

The planetary gear set 16 comprises a sun gear 24 connected directly to the intermediate shaft 13, a set of planetary pinions 25 in mesh with the sun gear 24, a set of planetary pinions 26 in mesh with the pinions 25, a ring gear 27 in mesh with the pinions 26 and a planetary gear carrier 28 for rotatably supporting the pinions 25 and 26. The ring gear 27 is formed integrally with a flange 29 on the end of the drive shaft 11. A one-way clutch 30 of the roller or sprag type is connected between the flange 29 and the intermediate shaft 13 and functions to permit the drive shaft 11 to overrun with respect to the intermediate shaft 13 but to prevent the intermediate shaft 13 from overrunning the drive shaft 11. The one-way clutch 30 completes a direct drive from the driven shaft 12 to the drive shaft 11 whenever the vehicle tends to overrun or drive the vehicle engine.

The hydraulic torque converter 15 comprises an input element or impeller 31, an output element or turbine 32 and a reaction element or stator 33. The planetary gear carrier 28 is connected directly to the impeller unit 31 and the turbine 32 is connected directly with the intermediate shaft 13. The stator element 33 is connected to a stationary member 34 by means of a one-way brake 35. The hydraulic torque converter 15 is filled with fluid and when it is converting torque, that is when the turbine 32 is rotating at a slower rate of speed than the impeller 31, the stator element 33 tends to rotate reversely but due to the action of the one-way brake 35 the stator element 33 is held stationary. When it is no longer necessary for the converter 15 to convert torque, that is when the speed of the turbine 32 substantially equals the speed of the impeller 31, the hydraulic torque converter functions substantially as a fluid coupling and at this time the stator element 33 rotates in a forward direction at the same speed as both the impeller 31 and the turbine 32.

When the vehicle is starting from rest, the intermediate shaft 13 is substantially stationary and accordingly the sun gear 24 of the planetary gear set 16 is also substantially stationary. Therefore, upon rotation of the drive shaft 11 and the ring gear 27 in a forward direction, the planetary gear carrier 28 is driven at an overdrive with respect to the ring gear and drive shaft, since the gear set 16 is of the dual planetary type. Since the impeller element 31 of the hydraulic torque converter 15 is directly connected with the planetary gear carrier 28, it too is driven at an overdrive with respect to the drive shaft 11. As the speed of the intermediate shaft 13 gradually increases and approaches the speed of the drive shaft 11 the planetary gear set 16 approaches a locked condition and the hydraulic torque converter 15 approaches the condition in which it operates as a fluid coupling with all of its elements 31, 32 and 33 rotating in unison. It is therefore apparent that initially there is a split power path from the drive shaft 11 to the intermediate shaft 13, one of the paths proceeding from the planetary gear carrier 28 through the hydraulic torque converter 15 and the other proceeding through the sun gear 24, but when the intermediate shaft 13 reaches approximately the same speed of rotation as the drive shaft 11 there is a direct drive therebetween with all of the elements of the planetary gear set 16 and of the hydraulic torque converter 15 rotating as a unit.

The intermediate shaft 13 has a plurality of internal splines which mate with a plurality of corresponding external splines formed on the intermediate shaft 14. The splined connection between the intermediate shafts 13 and 14 prevents relative rotation between the shafts but permits the intermediate shaft 14 to slide longitudinally. The shaft 14 is slidable axially to forward, neutral and reverse positions. The shaft 14 is provided with a transverse aperture 36 within which a compression spring 37 and a ball 38 are seated. The shaft 13 has three notches 39 for receiving the ball 38 when the shaft 14 is moved to any one of its forward, neutral and reverse positions. It is apparent that the ball 38 and notches 39 act as a detent to retain the shaft 14 fixed longitudinally in any one of its positions. A collar 40 retained in an axially fixed relation with respect to the shaft 14 by means of a pair of retaining rings 41 facilitates the movement of the shaft 14 to its positions. The shaft 14 is provided with two sets of teeth 42 and 43.

The planetary gear set 17 comprises a first sun gear 44, a second sun gear 45, a first set of planetary pinions 46 in mesh with the sun gear 44, a second set of planetary pinions 47 in mesh with the pinions 46 and with the sun gear 45, and a ring gear 48 in mesh with the pinions 47. The ring gear 48 is splined to a radially extending disc 49 that is riveted to the driven shaft 12 by means of a plurality of rivets 50. The planetary pinions 46 and 47 are rotatably mounted on a planetary gear carrier 51 which has a portion 52 concentrically mounted around the driven shaft 12. The sun gear 44 is floatingly mounted between the pinions 46 and the sun gear 45 is floatingly mounted between the pinions 47 but each sun gear is maintained axially fixed by means of a plurality of unnumbered spacer elements. The sun gear 44 has a plurality of internal teeth 53 engageable with the external teeth 42 on the intermediate shaft 14 when the shaft 14 occupies its forward drive position (the position shown in Fig. 1) and the sun gear 45 has a plurality of internal teeth 54 engageable with the external teeth 42 on the intermediate shaft 14 when the intermediate shaft 14 is moved to the right to its reverse drive position. The sun gear 44 therefore constitutes the input element of the planetary gear set 17 when the intermediate shaft 14 is in its forward drive position and the sun gear 45 constitutes the input element of the planetary gear set 17 when the intermediate shaft 14 is in its reverse drive position.

The combined clutching and braking device 18 includes one member 55 that consists of two cylindrical members 56 and 57 both of which are secured to the carrier 51 by means of a plurality of bolts 58 and each of the members 56 and 57 has a plurality of internal splines 59 and 60 respectively. The splines 59 and 60 are all helical in the same direction (as shown in Fig. 2). A pair of shiftable coupling elements 61 and 62 are respectively provided with helical splines 63 and 64 which mate respectively with the splines 59 and 60. The coupling elements 61 and 62 are axially notched as at 65 for receiving compression springs 66 that constantly urge the elements 61 and 62 away from each other. A plurality of pins 67 seated within suitable apertures formed in the element 62 are positioned within the springs 66 in order to hold the elements 61 and 62 in alignment. A plurality of yokes 68 are disposed about the inner periphery of the coupling elements 61 and 62 in appropriate slots provided therein and function to limit the movement of the elements away from each other. The yokes 68 are retained seated in their slots by means of a pair of retainer rings 69. The coupling element 62 is provided with a plurality of internal teeth 70 which are engageable with the external teeth 43 formed on the periphery of the intermediate shaft 14. The coupling element 61 is provided with a plurality of internal teeth 71 engageable with external teeth 72 formed on the periphery of a drum element 73 secured to the housing 10 by means of a plurality of bolts 74. A flange 75 welded to the drum element 73 provides an external bearing for the cylindrical member 56. A disc 76 rigidly secured to the planetary gear carrier 51 limits movement to the right of the coupling elements 61 and 62 and a stop ring 77 mounted within a suitable peripheral slot in the cylindrical member 56 limits movement of the shiftable coupling elements 61 and 62 to the left.

An oscillatable blocker element 78 is loosely mounted between the two cylindrical elements 56 and 57. The blocker element 78 has a plurality of blocking teeth 79 which are helical at the same angle as the teeth 59, 60, 63 and 64. The blocker teeth 79 are somewhat wider than the teeth on the coupling element and, as seen in Fig. 2, prevent movement of the teeth 64 to the left when the teeth 70 are engaged with the clutch teeth 43. When the teeth 71 on the coupling element 61 are engaged with the brake teeth 72 the blocker teeth 79 will have been displaced rotatably to a position such that the teeth 63 are blocked from movement to the right. The blocker 78 is provided with a plurality of pins 80 that extend through peripherally extending slots 80a in the periphery of the cylindrical element 56. The pins 80 permit the manual displacement of the blocker element 78 in order to bring its teeth 79 into blocking relation with respect to either the teeth 64 or the teeth 63. A collar 81 is provided for shifting the blocker 78 and has a plurality of spline teeth 82 (see Fig. 3) that mate with straight splines formed on the cylindrical element 56. The collar 81 also has a plurality of spiral splines 83 that receive the pins 80. A peripheral groove 84 receives a yoke (not shown) for facilitating the longitudinal displacement of the collar 81 to the left or right. When the collar 81 is moved to the left to its low and reverse position, as indicated, the splines 83 engage the pins 80 to move the blocker 78 in an upward direction, as viewed in Fig. 3, and movement of the blocker in this direction causes its teeth 79 to be moved out of blocking engagement with respect to the teeth 64. It is apparent that until the coupling elements 61 and 62 are moved to the left the blocking teeth 79 cannot be moved upwardly, as viewed in Fig. 2, beyond the teeth 63, but they can be moved sufficiently to unblock the teeth 64 and then upon movement of the elements 61 and 62 to the left the blocking teeth 79 can be moved further upwardly to block a return movement of the teeth 63 to the right. It is contemplated that the mechanism for moving the collar 81 will therefore at first move the collar a distance sufficient to cause unblocking of one set of teeth 63 or 64 and thereafter, upon movement of the coupling elements 61 and 62, the blocker element 78 will be moved further into a position to block one of the sets of teeth 63 or 64.

The present transmission provides two forward speed drives, including a reduced speed drive and a direct drive, and one reverse drive between the drive shaft 11 and the driven shaft 12. The transmission may be conditioned for reduced or low forward speed drive by moving the intermediate shaft 14 to its forward position to bring the teeth 42 into mesh with the teeth 53, and moving the coupling elements 61 and 62 to the left to bring the teeth 71 into engagement with the brake teeth 72. Under this condition of operation the planetary gear carrier 51 is held stationary to afford a reaction element for the rear planetary gear set 17 and the drive from the drive shaft 11 to the driven shaft 12 proceeds as follows: Assuming that the vehicle starts from rest the intermediate shaft 13 is initially stationary and the planetary gear carrier 28 is rotated in a forward direction but at an overdrive with respect to the drive shaft 11. Momentarily thereafter the intermediate shaft 13 will commence rotating in a forward direction with part of the drive being transmitted thereto through the hydraulic torque converter 15 and the remainder of the drive being transmitted thereto through the planetary gear set 16, with both the torque converter 15 and the planetary gear set 16 converting torque at this time. The drive then proceeds directly from the intermediate shaft 13 to the intermediate shaft 14 and thence through the sun gear 44, pinion 46, pinion 47 and through the ring gear 48 through the driven shaft 12. Initially there will be torque conversion in both planetary gear sets 16 and 17 as well as in the torque converter 15. As the speed of the vehicle increases, the intermediate shaft 13 will gradually increase in speed until it reaches that of the drive shaft 11 and when this occurs both the planetary gear set 16 and the hydraulic torque converter 15 will be rotating as a unit and thereafter torque conversion will only occur in the rear planetary gear set 17.

The transmission may be conditioned for a direct forward drive between the drive and driven shafts by engagement of the teeth 70 on the coupling element 62 with the teeth 43 on the intermediate shaft 14 when the intermediate shaft 14 occupies its forward drive position. Under this condition of operation both the planetary gear carrier 51 and the sun gear 44 are driven directly by the intermediate shaft 14 and accordingly the rear planetary gear set 17 is locked up and rotates as a unit with a direct drive being transmitted from the intermediate shaft 14 to the driven shaft 12.

A reverse drive power train is established through the present transmission when the intermediate shaft 14 is moved to a position whereby its teeth 42 engage the internal teeth 54 on the sun gear 45 and the teeth 71 on the coupling element 61 are moved into engagement with the brake teeth 72 in order to brake rotation of the planetary gear carrier 51. Under this condition of operation the drive to the intermediate shaft 14 is the same as was previously explained with reference to the operation in low forward speed drive. The intermediate shaft 14 is therefore driven in a forward direction. Inasmuch as the planetary gear carrier 51 is held stationary at this time and because of the fact that the sun gear 45, which is rotating in a forward direction, drives the pinion 47, the ring gear 48 is rotated reversely and consequently a reverse drive is completed to the driven shaft 12. During reverse drive the rear planetary gear set 17 at all times converts torque and the front planetary gear set 16 and the hydraulic torque converter 15 convert torque during reverse drive until the intermediate shaft 13 reaches the same speed of rotation as the drive shaft 11.

The combined clutching and braking device 18 is responsive to torque and the coupling elements 61 and 62 are moved to the right or left in accordance with the direction of the reaction on the planetary gear carrier 51. When the driven shaft 12 is rotating in a forward direction and power is being transmitted from the drive shaft 11 to the driven shaft 12 so that the drive shaft 11 drives the driven shaft, the reaction on the planetary gear carrier 51 is in a reverse direction, and assuming that the forward direction of rotation of the driven shaft 12 is in a clockwise direction when viewed from the left of Fig. 1, then the direction of reaction on the planetary gear carrier 51 is counterclockwise. When the vehicle accelerator pedal is released so that the engine drive shaft 11 no longer drives the driven shaft 12, the driven shaft itself tends to drive the engine and under this condition the direction of reaction on the planetary gear carrier 51 is in a clockwise direction. The combined clutching and braking device 18 is so constructed that when the reaction on the planetary gear carrier 51 is in a counterclockwise direction the coupling elements 61 and 62 will tend to be moved to the left to cause engagement between the brake teeth 72 and the teeth 71 and to cause disengagement between the teeth 70 and the teeth 43. When the direction of reaction on the planetary gear carrier 51 is in a clockwise direction the clutching and braking device 18 functions in a manner whereby there is a tendency for the coupling elements 61 and 62 to move to the right whereby the brake teeth 72 are disengaged from the teeth 71 and the clutch teeth 70 and 43 are engaged.

With particular reference to Figs. 2 and 4 the operation of the combined clutching and braking device 18 is as follows: As was stated previously when the drive shaft 11 tends to drive the driven shaft 12 the reaction on the planetary gear carrier 51 is in a counterclockwise direction and is indicated by the arrow designated by reference numeral 85, whereas the arrow 86 designates the direction of reaction on the planetary gear carrier 51 when the driven shaft 12 tends to drive the drive shaft 11. Assuming that the blocking teeth 79 on the blocker 78 are so positioned as not to block the free movement of the teeth 64 and 63 in either direction it is apparent that a reaction on the planetary gear carrier 51 in a counterclockwise direction, as indicated by the arrow 85, tends to move the teeth 63 and 64 to the left. Similarly a reaction on the planetary gear carrier 51 in a direction as indicated by the arrow 86, tends to move the teeth 63 and 64 to the right.

The brake teeth 72 and the clutch teeth 43 are respectively formed with engaging surfaces 87 and 88 and each has a beveled surface 89 on the end thereof. The teeth 71 on the coupling element 61 each have an engaging surface 90 and a beveled surface 91 and the teeth 70 on the coupling element 62 each have an engaging surface 92 and a beveled surface 93. Assuming first, that the transmission is operating in direct forward drive and that the blocking teeth 79 are moved to a position wherein neither the teeth 63 nor the teeth 64 are blocked, and further that the accelerator pedal of the vehicle is depressed sufficiently to cause the drive shaft 11 to drive the driven shaft 12, the reaction upon the planetary gear carrier 51 will change from a clockwise direction to a counterclockwise direction. The teeth 59 and 60 then move the teeth 63 and 64 to the left so that the clutch teeth 70 and 43 become disengaged and the engaging surfaces 90 on the teeth 71 engage the engaging surfaces 87 on the teeth 72 in order to brake rotation of the clutching and braking device 18 and planetary gear carrier 51 from rotating in a counterclockwise direction. The movement of the coupling elements 61 and 62 to the left occurs almost immediately upon a change in the direction of reaction upon the planetary gear carrier 51 from a clockwise direction to a counterclockwise direction and therefore engagement between the surfaces 90 and 87 is accomplished when there is only a very slight actual rotation of the coupling elements 61 and 62 in a counterclockwise direction. It is therefore apparent that there will be no clash upon the engagement of the teeth 71 and 72.

Again assuming that the blocking teeth 79 are in a position whereby neither the teeth 63 nor the teeth 64 are blocked, but also assuming that the transmission is operating in low forward drive and the vehicle accelerator pedal is released so that the driven shaft 12 will tend to drive the drive shaft 11 and the engine of the vehicle, then the direction of reaction upon the planetary gear carrier 51 will have changed from a counterclockwise direction to a clockwise direction as indicated by the arrow 86. The tendency for the carrier 51 to rotate in a clockwise direction causes the teeth 63 and 64 on the coupling elements 61 and 62 respectively to move to the right and almost immediately thereafter the coupling element 61 is moved to the right sufficiently to permit the beveled surfaces 89 and 91 respectively formed on the teeth 72 and 71 to slip past one another, with the teeth 71 actually moving in a clockwise direction and bouncing over the teeth 72, which bouncing is permitted by the spring 66. The teeth 70 also move to the right until the beveled surfaces 93 thereon engage the beveled surfaces 89 on the clutch teeth 43 but it will be recalled that the transmission was initially functioning in low forward drive and because of this fact the clutch teeth 43 on the intermediate shaft 14 are rotating in a clockwise direction at a much greater speed than the clutch teeth 70 on the coupling elements 62 which were initially stationary. Thus there is a relative rotation of the teeth 43 in a clockwise direction with respect to the teeth 70, although both sets of teeth are actually rotating in a clockwise direction. When the speed of rotation of the intermediate shaft 14 increases sufficiently due to the fact that the engine is no longer supplying power, the teeth 70 which are driven by the driven shaft 12 very rapidly approach the speed of rotation of the teeth 43. The moment that the teeth 70 tend to rotate in a clockwise direction, at a higher rate of speed than the teeth 43, the engaging surfaces 88 and 92 become engaged and the coupling element 62 is then free to complete its movement to the right. Complete engagement of the teeth 70 with the teeth 43 is shown in Fig. 4. It is therefore apparent that the teeth 70 and 43 engage silently and with no clash. It will be noted that after the teeth 71 become disengaged from the teeth 72, while the beveled surfaces 91 on the teeth 71 are ratcheting over the beveled surfaces 89 on the teeth 72 a neutral condition through the transmission is established until the speed of rotation in a clockwise direction of the teeth 70 increases to a speed just slightly greater than the speed of rotation of the teeth 43 on the intermediate shaft 14.

In a shift from direct forward drive to low speed forward drive a temporary neutral condition is also established and the reason for this is as follows. So long as the direct drive power train actually remains established the teeth 71 are driven in a clockwise direction and upon their movement to the left the beveled surfaces 91 thereon ratchet over the beveled surfaces 89 on the brake teeth 72. Upon disengagement of the teeth 70 from the teeth 43 the clockwise rotation of the clutch teeth 43 gradually increases with respect to the clockwise rotation of the teeth 70 and therefore the beveled surfaces 89 on the teeth 43 ratchet over the beveled surfaces 93 on the teeth 70. This condition, with the teeth 70 ratcheting over the teeth 43 and the teeth 71 ratcheting over the teeth 72 obtains until the speed of rotation of the planetary gear carrier 51 decreases and actually commences rotating reversely or in a counterclockwise direction whereupon the engaging surfaces 90 on the teeth 71 and 87 on the teeth 72 become engaged to complete the low forward speed power train. Thereafter the coupling elements 61 and 62 move completely to the left and complete engagement between the teeth 71 and 72 and complete disengagement between the teeth 70 and 43 is obtained.

The blocking teeth 79 serve the purpose of preventing an automatic shift from direct forward drive to low speed forward drive whenever the accelerator pedal of the vehicle is depressed and also of preventing an automatic shift from low speed forward drive to direct forward drive whenever the vehicle coasts. Thus a shift from low forward drive to direct is initiated by moving the collar 81 to the right in order to unblock the teeth 63 on the coupling element 61 and simultaneously releasing the accelerator pedal of the vehicle in order to permit the reaction upon the planetary gear carrier 51 to reverse itself and become clockwise. After the teeth 64 move completely to the right and the direct forward drive power train is completely established the blocking teeth 79 are then moved to the position shown in Fig. 2 wherein the teeth 64 are blocked from movement to the left. As long as the blocking teeth 79 remain in this position high speed forward drive through the transmission remains established. When a shift is to be made from direct forward drive to low speed forward drive the blocking teeth 79 are moved in a counterclockwise direction by means of moving the collar 81 to the left, until they strike the sides of the teeth 63. This unblocks the teeth 64 and upon depressing the accelerator of the vehicle power is transmitted to the driven shaft 12 and the reaction on the planetary gear carrier 51 is changed to a counterclockwise direction. The teeth 63 and 64 are then free to move to the left and do so until the low forward speed power train is established. The blocking teeth 79 are then moved slightly further in a counterclockwise direction in order to block the teeth 63 and prevent a direct forward drive power train from becoming established until the collar 81 is again moved to the right.

No means have been shown for moving the shift collar 81 partially and then completing its movement to the right or left as it is contemplated that conventional means will be utilized for this purpose.

It will be apparent to those skilled in the art that the present invention provides an efficient and smooth operating transmission, and it is contemplated that numerous changes and modifications may be made in the invention without departing from the spirit or scope thereof.

We claim:

1. In an engaging device for alternatively connecting an element of an automotive vehicle transmission with a braking member or with a drive shaft of the transmission wherein the reaction on the element is in one direction when the engine of the vehicle drives the vehicle and in the opposite direction when the vehicle drives the engine, the combination of a torque responsive mechanism connected with the element that tends to shift to one position to connect the element with the braking member when the reaction on the element is in the one direction and tends to shift to another position to connect the element with the drive shaft when the reaction on the element is in the opposite direction, an oscillatable blocking member movable to a first position to retain said torque responsive mechanism in its said one position and movable to a second position to retain said torque responsive mechanism in its said other position, a radially extending pin formed on said blocking member, and an axially shiftable control member carried by the element and engaged with said pin for moving said blocking member to either of its said positions.

2. In an engaging device for alternatively connecting an element of an automotive vehicle transmission with a braking member or with a drive shaft of the transmission wherein the reaction on the element is in one direction when the engine of the vehicle drives the vehicle and in the opposite direction when the vehicle drives the engine, the combination of a torque responsive mechanism connected with the element that tends to shift to one position to connect the element with the braking member when the reaction on the element is in the one direction and tends to shift to another position to connect the element with the drive shaft when the reaction on the element is in the opposite direction, an oscillatable blocking member movable to a first position to retain said torque responsive mechanism in said one position and movable to a second position to retain said torque responsive mechanism in said other position, a plurality of radially extending pins formed on said blocking member, and a control member longitudinally splined to the element and axially shiftable with reference thereto and having spiral grooves for receiving said pins to thereby move said blocking member to either of its said positions upon a shifting movement of the control member respectively to either of two positions.

References Cited in the file of this patent

UNITED STATES PATENTS

| | | |
|---|---|---|
| 931,656 | Sangster | Aug. 17, 1909 |
| 1,644,065 | Lanquetin | Oct. 4, 1927 |
| 1,703,846 | Jackson | Feb. 26, 1929 |
| 1,724,321 | Starr | Aug. 13, 1929 |
| 1,998,891 | Benson | Apr. 23, 1935 |
| 2,120,832 | Cotterman | June 14, 1938 |
| 2,245,017 | Sinclair | June 10, 1941 |
| 2,248,133 | Snow | July 8, 1941 |
| 2,360,711 | Orr | Oct. 17, 1944 |
| 2,462,657 | McNairy | Feb. 22, 1949 |
| 2,560,886 | Orr | July 17, 1951 |